Patented July 22, 1952

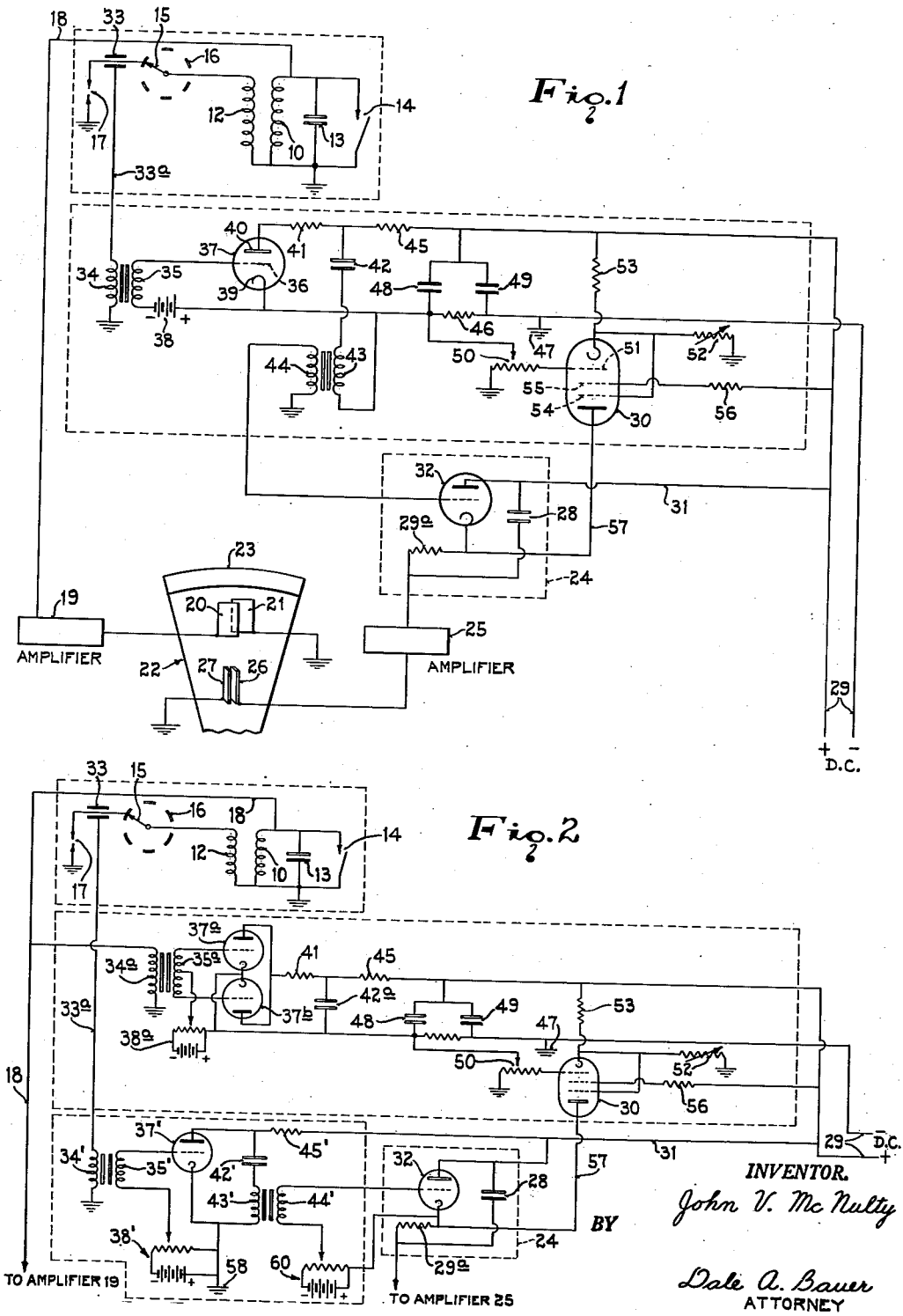

2,604,515

UNITED STATES PATENT OFFICE 2,604,515

ELECTRICAL CIRCUIT ANALYZING APPARATUS

John Volkman McNulty, Binghamton, N. Y., assignor to Bendix Aviation Corporation, New York, N. Y., a corporation of Delaware Application October 17, 1946, Serial No. 703,834

16 Claims. (Cl. 175—183)

This invention relates to electrical apparatus and more particularly to means for testing or analyzing electrical circuits such as ignition circuits for multi-cylinder internal combustion engines, or the like, during operation thereof.

One of the objects of the present invention is to provide novel means for checking the ignition system of an internal combustion engine for the purpose of readily and accurately locating the source of faulty or inefficient operation thereof.

Another object of the invention is to provide novel means of the above character which may be operably connected with the circuit to be tested without danger of appreciably affecting the normal operation of the circuit.

Still another object is to provide novel circuit testing apparatus whereby visible indications of circuit operation are obtainable and whereby said indications do not vary materially with engine speed or the frequency of the electrical impulses in the circuit.

A further object is to provide electrical circuit testing apparatus of the oscillograph type wherein the visible indications are materially improved with respect to those capable of being obtained in structures heretofore known.

Another object is to provide an automatically operable oscillograph adapted to produce indications having a constant sweep amplitude for a predetermined number of signals, irrespective of the sweep frequency or time base.

A still further object is to provide apparatus of the above character embodying novel means for securing a complete image of the initial pulse of each sweep or cycle when one of the signal pulses is employed as the triggering means for the sweep generator.

The above and further objects and novel features of the invention will more fully appear from the following detailed description when the same is read in conjunction with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

Fig. 1 is a diagrammatic illustration of one embodiment of the invention in its adaptation for testing the operation of an ignition system of an internal combustion engine; and Fig. 2 is a similar view of a modification with the oscillograph and associated amplifiers omitted.

A simple conventional ignition system is illustrated in the drawings, by way of example, as comprising a magnetogenerator having a transformer coil that consists of a primary winding 10 and a secondary winding 12. Connected across the primary winding is a condenser 13 and a circuit breaker 14 that is adapted to be periodically actuated by a cam or other conventional means (not shown). Electrical energy may be generated in the primary winding by a mutipole magnetic rotor (not shown) or any other suitable means well known in the art. The high potential or ungrounded end of secondary winding 12 is connected to the rotating electrode 15 of an ignition distributor which has a plurality of circularly disposed output terminals 16 that cooperate with electrode 15 in a known manner. Each of the terminals 16 is connected to a spark plug 17 in one of the engine cylinders. In operation, circuit breaker 14 is opened each time that a flow of current is built up in primary winding 10, thereby causing the induction of a high tension voltage in secondary winding 12 at a time when it is connected through a pair of distributor contacts 15, 16 to one of the engine spark plugs 17. The parts of the ignition system described above may be in the form of any well known construction and hence, it is believed that the same need not be described and illustrated in more detail particularly as such structures, per se, do not constitute a part of the present invention. It will be understood, of course, that the entire ignition system or any of its parts may be radio-shielded in any known or conventional manner.

For the purpose of analyzing the operation of the various circuits, including the different spark plugs in the above described ignition system, means are provided whereby the variable output of the magneto generator is employed in conjunction with a cathode ray type of oscillograph for generating saw-tooth signals which are synchronized to provide a saw-tooth sweep during each revolution of the rotary distributor electrode 15. Thus, in each sweep there occurs on the screen of the oscillograph an informative signal concerning each spark plug circuit in the sequence in which each such circuit is energized. In the embodiment illustrated, the ungrounded or high potential end of magneto primary winding 10 is connected through a lead 18 and a suitable amplifier 19 to the vertical deflecting plates 20, 21 of a cathode ray tube 22 (only partially shown) which may be of any suitable known construction. The variable voltage impressed across plates 20, 21 during operation of the magneto is effective to cause a corresponding vertical deflection of the electron ray projected between said plates and upon the screen 23 to produce a visible indication of the current or voltage variations in the ignition circuits. It will be understood that the signals impressed upon plates 20, 21 may be obtained in other ways, such as, by connecting said plates to the high tension or secondary winding 12. In either event, the signals will be representative of the electrical happenings in each operative circuit while each spark plug is connected in circuit with the source of energy by the distributor. The circuit constants can be so selected that the testing apparatus will drain only an insignificant amount of energy from the ignition system so that the operation of the latter will not be appreciably affected.

A sweep generator 24, to be hereinafter more fully described, is connected through a suitable amplifier 25 for applying a variable voltage across horizontal deflection plates 26, 27 to provide a horizontal time base for the saw-tooth sweep. Novel means are provided in conjunction with said sweep generator to maintain the horizontal amplitude of the sweep relatively constant, irrespective of the speed of the engine with which the ignition system is associated. The horizontal spacing of the signal indications for the various spark plug circuits will accordingly have a similar contour and size at all speeds or frequencies without affecting or changing the number or order of the indications of the signals representing the various spark plug circuits in each sweep or series of signals.

The sweep generator may be of any suitable known construction, the same, as shown in the drawings, comprising a storage condenser 28 connected across a direct current charging source 29. The negative terminal of the condenser is optionally connected to said source through a current limiting resistance 29a and a vacuum tube 30 for a novel purpose to be hereinafter fully described. The other terminal of the condenser is connected directly to the positive terminal of source 29 through a lead 31. As voltage builds up on condenser 28, a corresponding variation of voltage is impressed on horizontal deflection plates 26, 27 of the cathode ray tube 22 thereby causing horizontal deflection of the electron beam projected between said plates and plates 20, 21. An electronic control tube or valve 32, such as a thyratron, is connected across condenser 28 and resistance 29a for permitting the condenser to discharge whenever the tube is rendered conductive by suitable triggering means to be next described. When condenser 28 discharges and the voltage across the same drops, the electron ray in tube 22 is permitted to return to a horizontal reference position. As the voltage again builds up on condenser 28, said ray is deflected horizontally in a manner well known in the art.

In order that the signal indication for any given spark plug circuit will occur in the same position in each series of signals or sweep and hence, be immediately and accurately identifiable, the sweep generator is preferably triggered by a signal pulse from a selected one of the spark plug circuits or some other suitable periodic source which functions in synchronism with a selected one of the spark plug circuits. In this way the initial indication in each sweep will represent a selected spark plug circuit and the signals representing the other circuits will occur in a predetermined sequence thereafter. Since, as pointed out above, the amplitude of the horizontal sweep is maintained relatively constant, in accordance with the present invention, suitable identifying numerals or letters may be placed on the oscillograph screen 23 to identify each signal indication with the particular spark plug circuit which it represents. In the form shown, the periodic impulse for triggering sweep generator valve 32 is obtained through a capacity connection 33 which may be in the form of a metallic tube, or the like, surrounding but having no mechanical connection with a selected one of the spark plug leads extending from a distributor terminal 16 to a spark plug 17. Other suitable types of electrical pick-ups, such as a transformer, resistance divider or the like, may be used in lieu of the capacity pick-up shown. Tube 33 may be connected to ground through the primary winding 34 of a transformer or choke-coil which has a secondary winding 35. Thus, each time the selected spark plug circuit is energized an electrical pulse is transmitted through transformer 34, 35 in accordance with principles well understood in the electrical art.

One terminal of secondary winding 35 is connected to the grid 36 of a gaseous control tube or electronic valve 37, such as a thyratron, and the other terminal is connected through a biasing battery 38 to the cathode 39 of said tube. Cathode 39 is also connected to the negative terminal of source 29, whereas, the plate 40 of tube 37 is connected to the positive terminal of source 29 optionally through a current limiting resistance 41 and a resistance 45. Current from source 29 is permitted to flow through tube 37 only when it is triggered by a pulse of energy impressed upon transformer winding 35.

A storage condenser 42 and the primary winding 43 of a transformer coil, connected in series with each other and with resistance 41, are connected across the plate and cathode terminals of electronic valve 37 and hence, across the terminals of source 29. When valve 37 is non-conductive, a charge builds up on condenser 42 and the latter periodically discharges when said valve is rendered conductive in the manner heretofore described. This periodic discharge of condenser 42 through primary winding 43 induces a corresponding pulse in secondary winding 44 which is in turn connected to the control grid of electronic valve 32 of sweep generator 24. Each pulse thus impressed upon the grid of valve 32 renders the same conductive and permits the discharging of condenser 28 for a purpose heretofore described.

In order to maintain constant the horizontal sweep of the electron ray of the oscillograph, irrespective of the speed of the engine embodying the ignition system undergoing the test, and hence, irrespective of the sweep frequency, means are provided for making the speed or rate at which the sweep generator condenser 28 is charged relatively proportional to the speed of the engine. For this purpose, one end of a resistance 46 is connected to cathode 39 of tube 37 and the other end thereof is connected to ground at 47. A pair of condensers 48 and 49 are connected across resistance 46 and to plate 40 of tube 37 in the manner indicated in the drawing, to thereby function as a filter for smoothing out the flow of current through said resistance to which a pulsating current is supplied by reason of the periodic triggering of electronic valve 37. The current flow, and hence, the voltage drop across resistance 46, will vary in direct proportion to the frequency of the pulses which render tube 37 conductive, and hence, in direct proportion to the speed of the engine. Thus, as the engine speed increases the voltage drop across resistance 46 will also increase. A resistance 45 may be inserted between source 29 and condenser 42 to thereby cause said condenser to be charged in such a manner as to permit tube 37 to recover or heal after each discharge therethrough.

This voltage drop is applied through a variable potentiometer 50 to the control grid 51 of vacuum tube 30 which is shown as being of the pentode type, such as those known commercially as 6SJ7 and 6AG5. The cathode of tube 30 is shown as being connected to ground through a variable resistance 52 and to the positive terminal of source 29 through a resistance 53 in order to maintain the control grid negative with respect to the cathode. A suppressor grid 54 is directly connected to the cathode and a screen grid 55 is preferably connected through a resistance 56 to the positive terminal of source 29 whereby said screen grid is maintained at a proper positive potential. The plate of tube 30 is connected by a lead 57 to the cathode of sweep generator tube 32 and thence through current limiting resistance 29a to one terminal of sweep generator condenser 28.

As the variable voltage across resistance 46 is applied across the cathode and control grid 51 of pentode 30, thereby varying the bias on the grid, the resistance to the flow of current through said tube is likewise varied, the resistance variation being in inverse proportion to the voltage variation. Potentiometer 50 may be employed to select a suitable operating portion of the grid-plate current curve of tube 30 so that the current flow therethrough will be relatively proportional to the above mentioned voltage variation. Thus, the current flow through pentode 30 and hence, to sweep generator condenser 28 is caused to vary in proportion to the voltage variation across resistance 46 and hence, in proportion to the engine speed. Accordingly, at low and high engine speeds condenser 28 will be charged slowly and rapidly, respectively, in direct proportion or nearly direct proportion to engine speed so that the amplitude of the horizontal sweep of the oscillograph ray for each complete cycle of operation of the engine will be constant or sufficiently constant for all practical purposes.

The voltage drop across pentode 30, as a result of the flow of current therethrough from source 29 to charge condenser 28, is effective to automatically bias tube 32 of the sweep generator so as to render the cathode normally positive with respect to the grid. The tube is thus rendered non-conductive except when the grid is driven sufficiently positive by the application of a pulse from transformer 43, 44.

In operation, the varying voltage of the primary circuit of the magneto varies through a complete cycle during the energization of each spark plug circuit and is affected in a determinable manner by each of various types of defects in the system, such as, defects in the leads, spark plugs, distributor, magneto, or other part of the system. An image, representative of the voltage variations between the energizing of successively energized spark plug circuits, is created on the screen 23 by causing a cathode ray beam in tube 22 to move vertically between plates 20, 21 in accordance with said voltage variations. Said beam is caused to move simultaneously in a horizontal direction by the application of an independently generated rising voltage (the charge on condenser 28) to horizontal deflecting plates 26, 27. A visible saw-tooth type of image or pattern is thus traced on screen 23 by the electron beam during each cycle of engine operation. Each complete vertical cycle of the electron beam represents the voltage changes during the energization of a determinable spark plug circuit which may be identified on the screen by a numeral or other suitable means.

In order to periodically permit the electron beam of tube 22 to return to a horizontal reference position and thus reduce the required size of the screen to a practical minimum, the charge on condenser 28 is dissipated by discharging each time a selected spark plug circuit is energized. When the selected spark plug circuit is energized, a pulse is created through connection 33 and transformers 34, 35 and 43, 44 to the grid of tube 32 for the purpose of rendering the same conductive and hence, permit the discharge of condenser 28. Thus, during each horizontal sweep of the electron beam in tube 22, an image for each of the spark plug circuits during a complete cycle of operation of the engine is traced upon screen 23.

Without more, the pattern or image on screen 23 would vary in horizontal breadth as the cycle of events occurred with increased frequency, that is, as the speed of the engine is increased. This would result from the fact that the charging rate of condenser 28 would be constant and would accordingly cause a smaller horizontal deflection of the electron beam of tube 22, as the frequency of the cycles increased, that is, as the duration of each cycle decreased. This would in turn result in a pushing together or horizontal condensation of the individual images representing the different spark plug circuits and hence, would make the same more difficult to analyze at high speeds. This disadvantage is overcome in the structure comprehended by the present invention by the novel means for varying the rate at which condenser 28 is charged in accordance with variations in the speed of the engine. As heretofore fully described, this result is effected by creating a voltage drop across a resistance 46 which is proportional to engine speed and utilizing this variable voltage to vary the flow of current through electronic device 30 to the storage condenser 28.

In the embodiment illustrated in Fig. 2, the triggering impulses for controlling the discharge of condenser 42a, which corresponds with condenser 42, are obtained through a transformer 34a, 35a, directly from the connection 18 to the primary winding 10 of the magneto. The impulses are thus more frequent and alternate impulses being of opposite polarity are employed for rendering electronic valves 37a, 37b conductive to the discharges of condenser 42a. The latter is connected to source 29 and continuously subjected to the voltage thereof in the same manner as condenser 42 in the embodiment of Fig. 1. The grids of tubes 37a, 37b are connected to opposite ends of secondary winding 35a and the cathodes of said tubes are connected to a center tap from said secondary winding through a suitable tube biasing means 38a.

The secondary winding 35' of a transformer 34', 35' which has its primary winding connected to pick-up 33, is utilized for supplying the triggering impulse to the sweep generator tube 32. One end of said secondary winding 35' is connected to the grid of an electronic valve 37' and the other end thereof is connected to the cathode of said valve through a suitable biasing means 38'. A storage condenser 42' is connected in series with primary winding 43' of a transformer 43', 44' across the cathode and plate of tube 37' so as to discharge through said primary winding when the tube is rendered conductive by an impulse from transformer 34', 35'. A current limiting resistance, such as 41 may be included in this discharge circuit, if necessary.

The end of condenser 42' which is connected with the cathode of tube 37', is also connected to ground at 58 through winding 43' and the other end is connected through a resistance 45' to the positive terminal of source 29 whereby said condenser is continuously subjected to a charging voltage. Secondary winding 44' is connected at one end to the grid of tube 32 of sweep generator 24 and for the purpose of more selective control the other end thereof may be connected to the cathode of said tube through a variable biasing means 60.

In other respects the embodiment of Fig. 2 is the same as that described above in Fig. 1. Where possible the same numerals have been employed for designating corresponding parts and where this has not been possible the same numeral is supplemented by a letter or a prime has been used.

In reading and interpreting the foregoing description and the claims which follow, the terms "constant" and "proportional" should be read to mean nearly or substantially constant or proportional. These terms are used to define a constancy or proportionality which is sufficient for all practical purposes in any given or particular application of the invention. For example, the voltage drop across resistance 46 need only be relatively proportional to the speed of the engine in order to obtain sufficient constancy of the horizontal sweep of the oscillograph image, to render the separate parts of the image readily identifiable by fixed indicating means on the screen. The novel means for varying the charging rate of condenser 28 will effect advantageous results by merely preventing some of the natural horizontal condensation of the oscillograph image with increases in speed, even though a constant horizontal sweep amplitude is not attained.

There is thus provided novel apparatus for analyzing or testing electrical circuits such as those embodied in the ignition system of an internal combustion engine. In a system embodying a plurality of circuits such as in an ignition system, the apparatus comprehended provides means to produce visible indications of voltage changes in the various circuits in a predetermined sequence and in predetermined positions on a screen, or the like, independently of the frequency with which said circuits are energized. Apparatus embodying the invention may be inexpensively constructed and embodied in a sufficiently small space to make the same practical for installation on aircraft and other vehicles which embody internal combustion engines.

Although only a limited number of embodiments of the invention have been illustrated in the accompanying drawings and described in detail in the foregoing specification, it is to be expressly understood that the invention is not so limited. For example, the pulses for triggering tube 32 might be taken directly from the transformer 34, 35 or 34', 35', if desired, as by connecting pick-up 33 directly to primary winding 43. Different types of gaseous and vacuum tubes having the same function or capable of performing the same functions as the types herein mentioned, might also be used. The principles of the invention might also be applied in conjunction with other types of oscillographs. Various other changes might also be made in the details of construction, as well as in the arrangement of the parts illustrated, without departing from the spirit and scope of the invention as it will now be understood by those skilled in the art. For a definition of the limits of the invention reference is had primarily to the appended claims.

What is claimed is:

1. In apparatus of the class described, an oscillograph, means for connecting said oscillograph to an electrical circuit to cause the same to produce indications representing voltage variations in said circuit, and means for automatically varying the time base of said oscillograph including a condenser discharge circuit intermittently operable in accordance with the frequency of an intermittently recurring event in said circuit, said means including a second condenser discharge circuit comprising a normally non-conductive electronic valve rendered intermittently conductive in accordance with said frequency for varying the charging rate of a storage condenser in said first-named condenser discharge circuit.

2. In apparatus for producing successive visible patterns indicating the functioning of a cyclically operating electrical circuit, means for synchronizing the horizontal sweep of the pattern with the cycle of said circuit, and means for maintaining the horizontal sweep relatively constant irrespective of variations in the cyclic frequency of said circuit, said last-named means including a storage condenser and an intermittenly operable condenser discharge circuit for controlling the charging rate of said storage condenser in accordance with said frequency.

3. In apparatus adapted for producing an image representative of a series of recurring events in an electrical circuit, means including a storage condenser and triggering means therefor for synchronizing the horizontal sweep of the image with the cycle of said series of events, and means for automatically varying the time base of said horizontal sweep in accordance with the variations in the frequency of said events, said last-named means comprising a condenser discharge circuit having a normally non-conductive electronic valve in circuit with a storage condenser and a transformer inductively connecting the control grid of said valve with said electrical circuit.

4. In apparatus of the class described, an oscillograph, means including a storage condenser for synchronizing the time base thereof with an intermittently recurring event in an electrical circuit, and means for automatically varying the time base of the oscillograph in accordance with variations in the frequency with which said event occurs, said last-named means including a second storage condenser and a normally non-conductive electronic valve for controlling the discharging of said second condenser to control the charging rate of said first-named storage condenser in accordance with said frequency.

5. Apparatus comprising a condenser, means for charging said condenser, means for intermittently causing said condenser to discharge, and means for causing said condenser to assume a relatively constant maximum charge irrespective of the frequency with which it is caused to discharge, said last-named means including a condenser discharge circuit rendered operable in accordance with the frequency of operation of said second named means, said circuit including a condenser and a normally non-conductive electronic valve for controlling the discharge thereof.

6. Apparatus comprising a condenser, means for charging said condenser, means for intermittently causing said condenser to discharge, and means for varying the charging rate of said condenser when the discharge frequency thereof is varied, said last-named means including a second condenser and normally non-conductive electronic valve means for controlling the discharging of said second condenser in accordance with a frequency which is a multiple of said discharge frequency.

7. Apparatus comprising a condenser, means for charging said condenser, means for intermittently causing said condenser to discharge, and means for varying the charging rate of said condenser in accordance with variations in the discharge frequency thereof, said last named means including a second condenser and electronic valve means for controlling the discharging thereof.

8. In apparatus of the class described, an oscillograph, means for connecting said oscillograph to an alternating current circuit to cause the same to produce indications representing voltage variations in said circuit, and means for automatically varying the time base of said oscillograph in accordance with the frequency of the current reversals in said circuit, said last named means including a condenser discharge circuit comprising at least one normally non-conductive electronic valve.

9. Apparatus comprising a condenser, means including an electronic tube for charging said condenser, means for periodically causing said condenser to discharge, and means for varying the charging rate of said condenser in accordance with variations in the frequency of current reversals in an electrical circuit, said last named means including a condenser discharge circuit for controlling the conductivity of said electronic tube.

10. Apparatus comprising a condenser, means for charging said condenser, means for causing said condenser to discharge at the same frequency as a predetermined recurring event in an electrical circuit, said means including a storage condenser and triggering means therefor, and means for varying the charging rate of said condenser in accordance with the frequency of current reversals in said circuit, said last-named means comprising a condenser discharge circuit having a normally non-conductive electronic valve in circuit with a storage condenser and a transformer inductively connecting the control grid of said valve with said electrical circuit for rendering said valve intermittently conductive to the charge on said last-named condenser.

11. Apparatus comprising a condenser, means for charging said condenser, means for intermittently causing said condenser to discharge, and means for varying the charging rate of said condenser in such a manner that it will assume a relatively equal charge during each charging interval thereof irrespective of variations in said interval, said last named means including a condenser discharge circuit comprising at least one electronic valve that is rendered conductive in accordance with the frequency of operation of said second named means and a storage condenser dischargeable through said valve when the latter is rendered conductive.

12. Apparatus for analyzing an internal combustion engine ignition circuit having a source of alternating current and a distributor for directing said current to a plurality of branches of said circuit in predetermined sequence, said apparatus comprising an oscillograph, means for connecting said oscillograph to said source to cause the same to produce indications representing voltage variations in said circuit, means for synchronizing the time base of said oscillograph with the frequency of energization of one of said branches, and means controlled by the frequency of current reversals at said source for maintaining the sweep of said oscillograph relatively constant irrespective of said last named frequency, said last-named means including a condenser discharge circuit comprising at least one electronic valve that is rendered conductive in accordance with one of said frequencies.

13. Apparatus for analyzing an ignition circuit having a source of electrical current and a distributor for directing said current to a plurality of branches of said circuit in predetermined sequence, said apparatus comprising an oscillograph, means for connecting said oscillograph to said circuit to cause the same to produce indications representing voltage variations in said circuit, means for synchronizing the horizontal sweep of the oscillograph image with the periodic energization of one of said branches, and means controlled by the frequency of predetermined recurring events in said circuit for maintaining said horizontal sweep relatively constant irrespective of said frequency, said last-named means including a condenser discharge circuit comprising at least one electronic valve that is rendered conductive in accordance with the frequency of said events.

14. Apparatus comprising a storage condenser, means for charging said condenser, an electronic valve for permitting said condenser to discharge, means including a normally non-conductive electronic valve and an electronic tube having the control grid thereof connected to said second-named valve for varying the rate at which said condenser is charged, and means for providing intermittent impulses for triggering said valves.

15. Apparatus comprising a storage condenser, means for charging said condenser, an electronic valve for permitting said condenser to discharge, means for triggering said valve in accordance with the frequency of a recurring event in an electrical circuit, means including an electronic valve for varying the rate at which said condenser is charged, and means for triggering said second named valve in accordance with the frequency of current reversals in said circuit.

16. In apparatus of the class described, an electronic sweep generator for an oscillograph, said generator including a storage condenser and an electronic valve for controlling the discharge of said condenser, and means for controlling the charging rate of said condenser, said means including a condenser discharge circuit comprising a normally non-conductive electronic valve rendered intermittently conductive in accordance with the frequency of a recurring event.

JOHN VOLKMAN McNULTY.

REFERENCES CITED

The following references are of record in the file of this patent:

UNITED STATES PATENTS

| Number | Name | Date |
|---|---|---|
| 2,108,014 | Jones | Feb. 8, 1938 |
| 2,232,959 | Miller | Feb. 25, 1941 |
| 2,266,516 | Russell | Dec. 16, 1941 |
| 2,366,355 | Roberts | Jan. 2, 1945 |
| 2,420,303 | De France | May 13, 1947 |
| 2,428,926 | Bliss | Oct. 14, 1947 |
| 2,448,069 | Ames, Jr., et al. | Aug. 31, 1948 |
| 2,449,848 | Hefele | Sept. 21, 1948 |
| 2,450,164 | Ramsay | Sept. 28, 1948 |
| 2,492,018 | Sunstein | Dec. 20, 1949 |
| 2,553,059 | McCullough | May 15, 1951 |